Jan. 11, 1966     H. W. NEIDHARDT ETAL     3,228,312

MULTI-WHEEL ROAD ROLLER

Filed May 17, 1962     4 Sheets-Sheet 1

*INVENTOR.*
Heinz Werner Neidhardt
Heinz Schäfer
BY
Mestern, Ross + Mestern

United States Patent Office 3,228,312
Patented Jan. 11, 1966

3,228,312
MULTI-WHEEL ROAD ROLLER
Heinz Werner Neidhardt, Blumenroderstrasse 90, Limburg (Lahn), Germany, and Heinz Schäfer, Elz by Limburg (Lahn), Germany
Filed May 17, 1962, Ser. No. 195,575
Claims priority, application Germany, May 18, 1961, Sch 29,721
4 Claims. (Cl. 94—50)

Our present invention relates to a multiwheel road roller with two wheel assemblies, on which the weighted chassis rests at three suspension points. Self-propelling multiwheel road rollers operating as compactors, with all the wheels producing a uniform compacting pressure and the dead-loaded chassis resting on two suspension points in the nonsteerable rear-wheel assemblies and on one suspension point for the steerable front wheels, are known. In one construction of this conventional kind of vehicle, which has four wheels in the driving assembly and three in the steering assembly, a differential gear is provided between each pair of driving wheels and is connected to the main gearbox of the road roller through horizontal universal joint shafts, each with a bevel-gear drive. In these compactors the dead-loaded chassis rests at two suspension points on the driving-wheel assembly, by means of two supporting arms, at the ends of which the differential gears referred to are mounted.

It is easy to appreciate the considerable structural work called for to provide a drive to four individual wheels, which makes the production of such compactors on a competitive basis unprofitable. Moreover, owing to the special arrangement of the drive, the driving wheel assembly cannot be steered; this, however, necessarily means uneven surfacing when traveling through curves.

To avoid these difficulties, it has already been proposed to use for the driving-wheel assembly only one differential gear to be placed between the center wheels in a four-wheel assembly. The outer wheels are driven by universal-joint shafts through the hubs of the inner wheels. Each of the outer wheels is rigidly secured to the adjacent wheel by a hollow hub. In this way it has been possible to save a considerable amount of structural work on the four-wheel drive, while ensuring that each wheel exerts a uniform compacting pressure on the ground.

Since all countries, in recent times, have had to invest considerable sums in road building and are bound to plan still heavier investment in the future, close attention is being paid to the compacting of soil in all its varieties of composition and conditions. More multiwheel road rollers are being used primarily because it has come to be recognized that in the principle of the multiwheel roller there are new and still unexhausted possibilities of carrying out the compacting of widely varying soils to an extent which, from the economic standpoint, has hitherto neither theoretically nor practically been attainable with other kinds of compactors.

It has been found, however, in the course of many practical tests, that where the terrain is very difficult, as for example where the ground consists of very wet, greasy clay or loam, the drive of existing multiwheel compactors is not adequate to meet compaction requirements satisfactorily.

To solve this problem, the invention provides for each wheel in both wheel assemblies to be so connected as to rotate independently, and to be positively driven with the same large torque as with other wheels.

We believe that this problem has heretofore defied solution on account of an apparent contradiction in the requirement that a wheel, while having to adapt itself automatically to variations of the terrain so as to exert even ground pressure, should be connected positively to the gearbox. Until now, it was thought that one condition (wheel with independent drive) excluded the other (positive drive), especially when it is borne in mind that at least one wheel assembly had to be steerable.

In the roller according to the invention, however, a simple solution to this difficult problem has been achieved.

In one particular construction according to the invention, a multiwheel road roller with a front assembly of three wheels and a rear assembly of four individual wheels spaced from one another is provided with a common change-speed and reversing gearbox and two articulated shafts extend to bevel-gear drives, above the wheel assemblies, which are connected to differential gears. It is preferred for the front wheel assembly to have a bogie ring or rotating track which can rotate around a vertical axis, to support the chassis, and a saddle frame or bolster which can rotate in the bogie ring or rotating track on a horizontal axis, the bevel gear being mounted in the horizontal axis of rotation of the saddle frame or bolster.

In this front wheel assembly, the connection between the bevel gear and the articulated or universal-joint shaft leading to the gearbox preferably should be made through a double universal joint lying at a location where the vertical axis of the bogie makes it possible. This arrangement incorporating a double universal joint represents a material, essential conception of the invention, because it is this which makes it possible for an assembly of driven wheels, each individual one of which exerts uniform compacting pressure on the ground, to be steered without interfering with the compacting action or the drive.

According to another feature of our invention, the saddle frame of the front wheel assembly has two suspension arms—forming for example a V—for the suspension of the individual wheels, one of these suspension arms carrying the differential gear mounted in line with the wheel axis, the differential gear being connected to the bevel-gear by an articulated shaft.

The invention further provides means wherein one of the three wheels in the front assembly is suspended, so as to rotate but not to swing, in a rotatable bearing in one suspension arm of the saddle frame whereas the other two wheels form a pair and can be suspended so as to swing on the other suspension arm. It is preferable for the inner wheel to be rigidly connected to the cage of the differential gear, while the two outside wheels can be driven by the differential wheels of the differential gear. In this way, by virtue of the differential drive, it is possible—in addition to providing uniform compacting and independent drive to the individual wheels—to have differential movement on bends or curves. With this arrangement it is preferred that the outer wheel farthest from the differential gear be driven by an articulated shaft passing through the differential cage. It is also advantageous if the articulated shaft can be varied in length, to enable the individual wheels to adjust their position while the torque remains constant.

The articulated or universal joint shaft connection between bevel gear and differential should be enclosed in a dustproof casing, as far as possible, and positioned in one arm of the saddle frame, to avoid the occurrence of gear trouble caused by dust or dirt in the course of the heavy work of compacting.

The front wheel assembly, preferably consisting of three single wheels, serves as the steering assembly. The rear assembly may be constructed, for example, in accordance with our U.S. Patent No. 3,119,313, issued January 28, 1964. In that case, both sets of driving wheels can be made steerable.

The invention is diagrammatically illustrated by way of example in the accompanying drawing in which.

Figure 1:
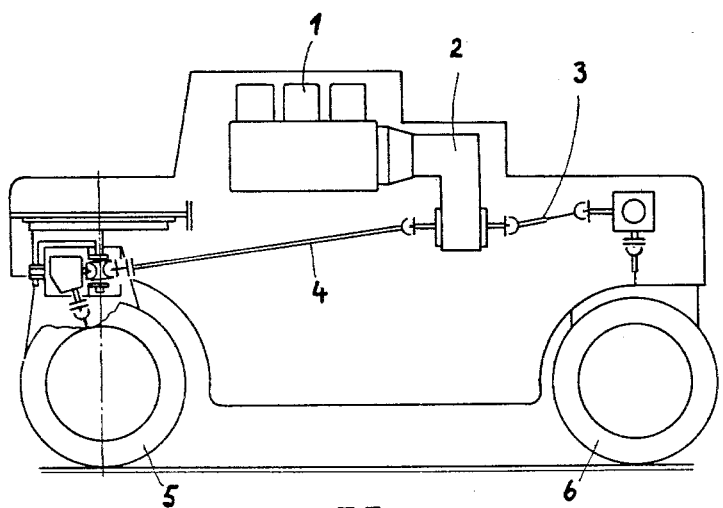
FIGURE 1 is a side elevation of a self-propelled compacting roller with positively driven wheels.
Figure 2:
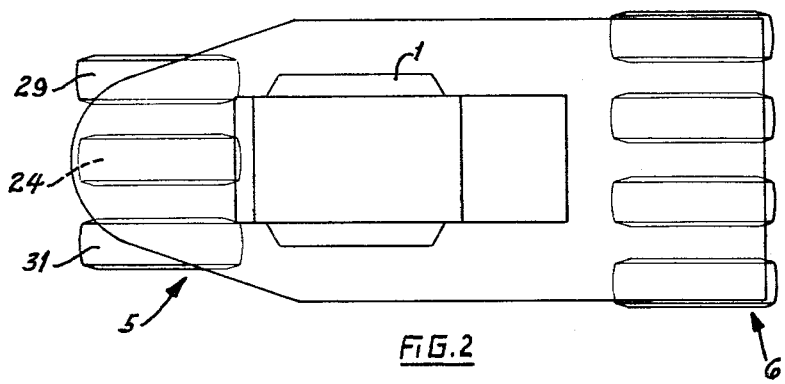
FIGURE 2 is a corresponding plan view.

In the side elevation and plan view of a road roller according to the invention as illustrated in FIGURES 1 and 2, the engine 1 is located centrally. Its torque is transmitted through a change-speed and reversing gearbox 2 to articulated or universal joint shafts 3 and 4, which extend from gearbox 2 to the front wheel and rear wheel assemblies 5 and 6, respectively.

The wheel arrangement of the road roller is such that there are four wheels in rear assembly 6 and three wheels in front assembly 5.

Figure 3:
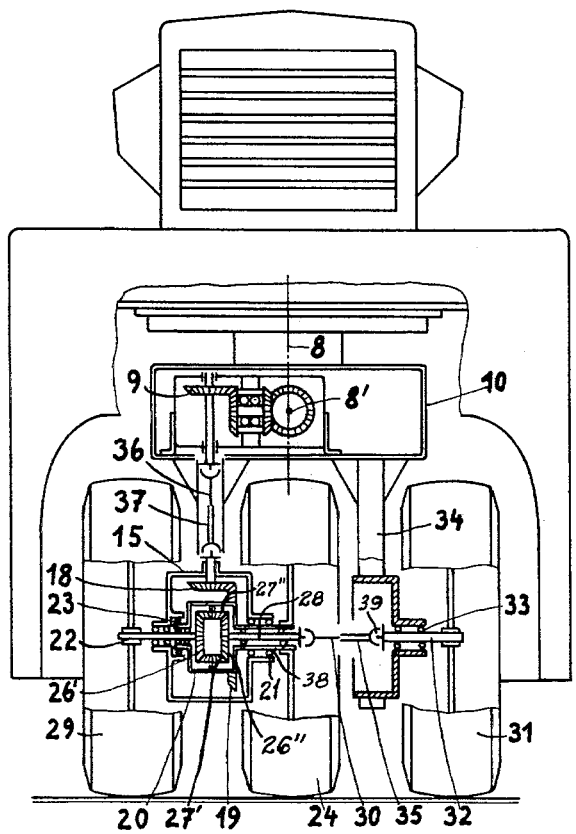
FIGURE 3 is a vertical section through the front wheel assembly of the compacting roller shown in FIGURE 1.
Figure 4:
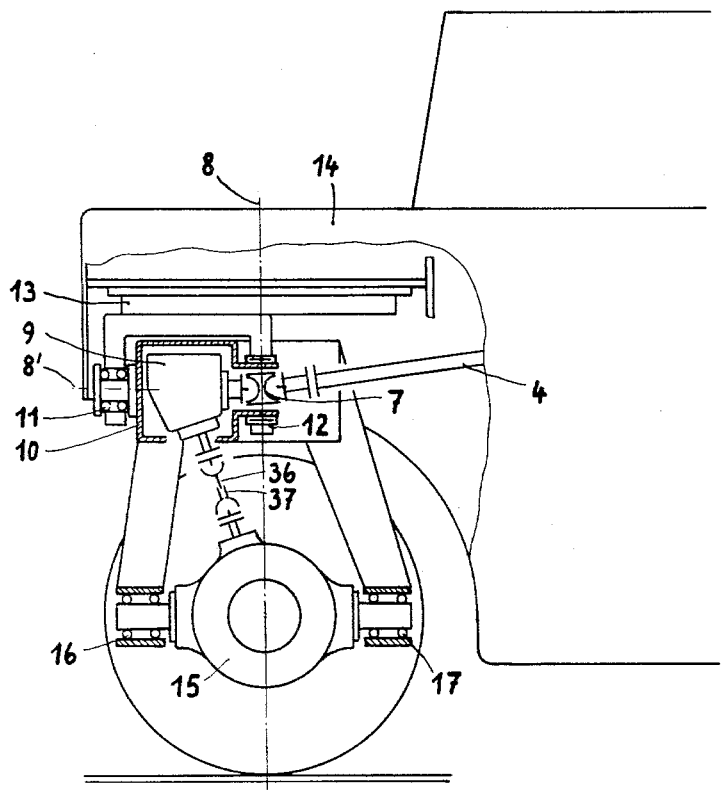
FIGURE 4 is a vertical section through the front wheel assembly in a different plane.

Front wheel assembly 5, as shown in FIGURES 3 and 4, takes its drive from power shaft 4 by way of double universal joint 7, which, in accordance with the steering function of the front axle, lies at the point of intersection of vertical and horizontal axes of rotation 8 and 8'. A bevel gear train 9 takes its drive through universal joint 7.

The housing of bevel gear 9 is secured in a turning saddle-box frame 10, which is supported in journal bearings 11 and 12. The saddle frame 10 can thus rotate on horizontal axis 8'. The whole is linked to a chassis 14 through an intermediate rotary member (bogie ring) 13, so as to turn about the vertical axis 8.

The torque of bevel gear train 9 is transmitted by a drive shaft 36, including a length compensator 37, to the axle gearing in a casing 15. The casing 15 pivots on bearings 16 and 17 of saddle frame 10. A bevel pinion 18 (FIGURE 3) engages with a crown wheel 19, which is rigidly secured to differential cage 20. The differential cage 20 runs in bearings 21 and 23 in casing 15. A central road wheel 24 is rigidly connected at 25 to the hub 38 of the differential cage 20, this hub having the form of a tubular stud coaxial with a pair of sun gears 26', 26" in cage 20.

Inside the differential cage 20 is mounted a differential 26 including the aforementioned sun gears 26', 26" along with a pair of planet gears 27', 27". Shafts 22 and 28 load off to each side from sun gears 26' and 26", respectively. The shaft 22 is rigidly connected via a universal joint 29 to an outer road wheel 29, while shaft 28 has an extension shaft 30 connected to it and passes through the hub 38.

Another outer road wheel 31 is connected to a shaft 32 which runs in a bearing 33 in a leg 34 of saddle frame 10. Wheel 31 takes its drive from propeller shaft 30 with length compensator 35.

The construction hereinbefore described gurantees that the chassis weight falling on the front axle is evenly distributed over wheels 24, 29 and 31, since the wheels can adapt themselves to follow irregularities in the ground. Wheels 24 and 29 swing in bearings 16 and 17 (FIGURE 4) and also, with wheel 31, through saddle frame 10, on bearings 11 and 12 (FIGURES 3 and 4). In the driving train, the drive elements in the shape of articulated shafts 30 and 36 with length compensation (FIGURE 3) allow for the mutual swing between the various members.

The provision of axle gearing between wheels 24 and 29 ensures that each of the wheels 24, 29 and 31 receives the appropriate drive and that the two outer wheels 29 and 31 are given the necessary compensation through the differential gear at turns and bends. These kinematic conditions are achieved by virtue of the fact that the two outer wheels 29 and 31 are connected to differential 26, whereas the middle wheel, which owing to its central position needs no differential compensation, is driven directly from the hub of differential cage 20.

Figure 7:
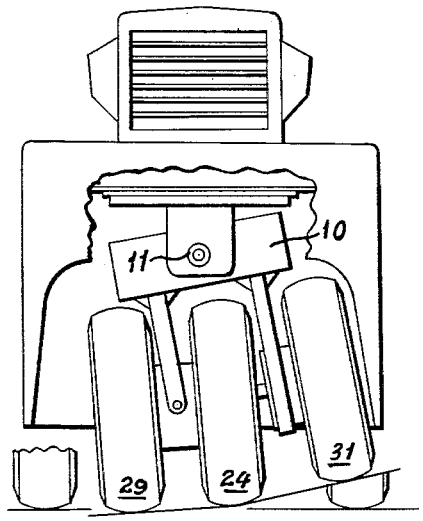
FIGURE 7 is a front elevation of the front wheel assembly on uneven ground.
Figure 5:
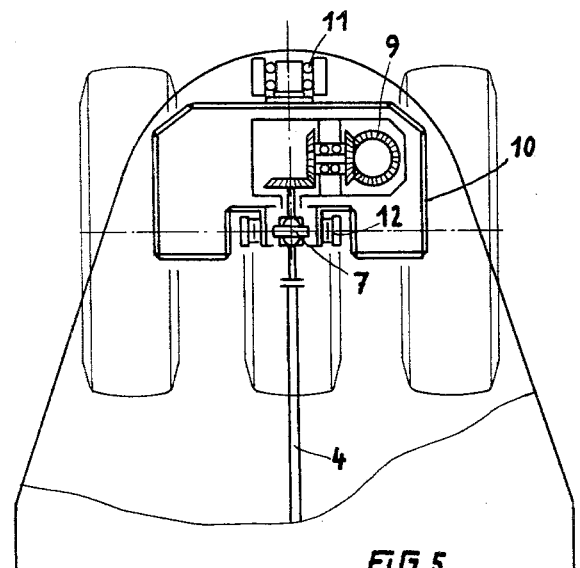
FIGURES 5 and 6 show horizontal sections through the saddle frame of the front wheel assembly when driving straight ahead and on a curve.
Figure 6:
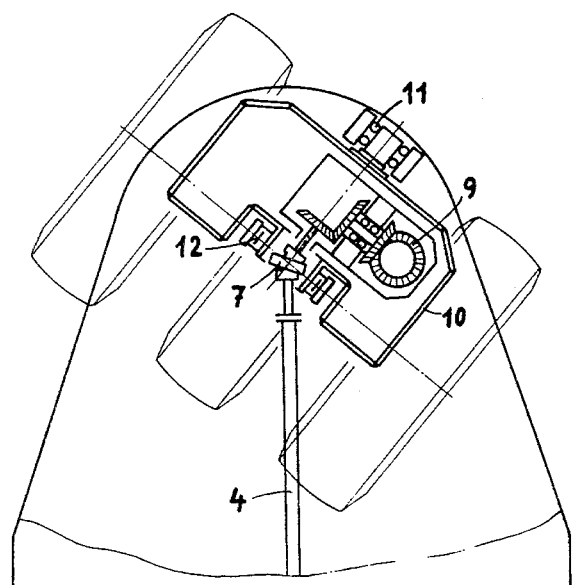

The arrangement of the double universal joint 7, shown in FIGURE 4, can best be explained, as regards mode of operation, by reference to FIGURES 5 and 6. FIGURES 5 and 6 represent a horizontal section through bevel gear train 9. As already mentioned, double universal joint 7 lies at the point of intersection of axes 8 and 8'. Thus, even when the wheels are turned with a 45° steering lock (FIGURE 6), perfect power transmission from shaft 4 to gear train 9 is possible, while, in addition, the individual wheels 24, 29 and 31, as shown typically in FIGURE 7, can automatically adapt themselves so as to produce uniform compacting under each wheel.

We claim:

1. A multiwheel assembly for a road roller, comprising central wheel means; first and second outer wheel means flanking said central wheel means; and a common drive for all said wheel means including a power shaft, a differential housing directly and positively connected with said central wheel means and coupled with said power shaft for rotation about the axis of said central wheel means together with the latter, said housing being disposed between said central wheel means and said first outer wheel means, differential gear means in said housing including a pair of sun gears centered on said axis, a first driven shaft connecting one of said sun gears with said first outer wheel means, and a second driven shaft connecting the other of said sun gears with said second outer wheel means, said second driven shaft passing axially through said central wheel means.

2. A multiwheel assembly for a road roller, comprising a central wheel; a first and a second outer wheel flanking said central wheel; and a common drive for all said wheels including a power shaft, a differential housing directly and positively connected with said central wheel and coupled with said power shaft for rotation about the axis of said central wheel together with the latter, said housing being disposed between said central wheel and said first outer wheel, differential gear means in said housing including a pair of sun gears centered on said axis, a first driven shaft connecting one of said sun gears with said first outer wheel, and a second driven shaft connecting the other of said sun gears with said second outer wheel, said second driven shaft having a first section passing axially through said central wheel and a second section articulated to said first section between said central and second outer wheels.

3. In a road roller, in combination, a steerable support rotatable about a vertical axis; a frame carried on said support for swinging about a horizontal axis intersecting said vertical axis; a front-wheel assembly provided with bearing means suspended on said frame, said assembling comprising a central wheel and first and second outer wheels flanging said central wheel; and a common drive for all said wheels including a power shaft provided with a universal joint at the intersection of said axes, a differential housing directly and positively connected with said central wheel, said housing being coupled with said power shaft for rotation about the axis of said central wheel together with the latter and being disposed between said central wheel and said first outer wheel, differential gear means in said housing including a pair of sun gears centered on the axis of said central wheel, a first driven shaft connecting one of said sun gears with said first outer wheel, and an articulated second driven shaft connecting the other of said sun gears with said second outer wheel, said second driven shaft passing axially through said central wheel.

4. In a road roller, in combination, a steerable support rotatable about a vertical axis; a frame carried on said support for swinging about a horizontal axis intersecting said vertical axis; a front-wheel assembly provided with bearing means suspended on said frame, said assembly comprising a central wheel and first and second outer wheels flanking said central wheel; and a common drive for all said wheels including a power shaft provided with a universal joint at the intersection of said axes, a differential housing having a tubular stud directly and positively connected with said central wheel, said housing being coupled with said power shaft for rotation about the axis of said central wheel together with the latter and being journaled in said frame between said central wheel and said first outer wheel with freedom of rotation about a horizontal axis transverse to said tubular stud, differential gear means in said housing including a pair of sun gears centered on the axis of said central wheel, a first driven shaft connecting one of said sun gears with said first outer wheel, and an articulated second driven shaft connecting the other of said sun gears with said second outer wheel, said second driven shaft including a first section passing coaxially through said tubular stud and said central wheel, a second section journaled in said frame and rigid with said second outer wheel, and a third section interlinking said first and second sections.

References Cited by the Examiner
UNITED STATES PATENTS

| | | | |
|---|---|---|---|
| 1,392,365 | 10/1921 | Smith et al. | 180—49 |
| 1,918,221 | 7/1933 | Weber et al. | 180—44 |
| 2,443,147 | 6/1948 | Ritchie | 94—50 |
| 2,668,597 | 2/1954 | King | 180—75 |
| 2,954,088 | 9/1960 | Williamson et al. | 94—50 |
| 3,016,636 | 1/1962 | Lado | 180—44 X |
| 3,060,818 | 10/1962 | Roberts | 94—50 |

CHARLES E. O'CONNELL, *Primary Examiner.*

JACOB L. NACKENOFF, *Examiner.*